(12) United States Patent
Ahn et al.

(10) Patent No.: US 11,283,058 B2
(45) Date of Patent: Mar. 22, 2022

(54) METHOD OF PREPARING SLURRY COMPOSITION FOR SECONDARY BATTERY POSITIVE ELECTRODE, POSITIVE ELECTRODE FOR SECONDARY BATTERY PREPARED BY USING THE SAME, AND LITHIUM SECONDARY BATTERY INCLUDING THE POSITIVE ELECTRODE

(71) Applicant: LG Chem, Ltd., Seoul (KR)

(72) Inventors: Byoung Hoon Ahn, Daejeon (KR); Houng Sik Yoo, Daejeon (KR); Gye Min Kwon, Daejeon (KR); Sang Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 169 days.

(21) Appl. No.: 16/495,170

(22) PCT Filed: Mar. 22, 2018

(86) PCT No.: PCT/KR2018/003395
§ 371 (c)(1),
(2) Date: Sep. 18, 2019

(87) PCT Pub. No.: WO2018/174619
PCT Pub. Date: Sep. 27, 2018

(65) Prior Publication Data
US 2020/0295347 A1    Sep. 17, 2020

(30) Foreign Application Priority Data

Mar. 22, 2017    (KR) .......................... 10-2017-0036335
Mar. 22, 2018    (KR) .......................... 10-2018-0033151

(51) Int. Cl.
*H01M 4/00* (2006.01)
*H01M 4/04* (2006.01)
(Continued)

(52) U.S. Cl.
CPC ......... *H01M 4/0416* (2013.01); *H01M 4/364* (2013.01); *H01M 4/525* (2013.01);
(Continued)

(58) Field of Classification Search
CPC ............. H01M 10/0525; H01M 4/364; H01M 2300/0037; H01M 10/056; H01M 4/661; H01M 2004/028
See application file for complete search history.

(56) References Cited

U.S. PATENT DOCUMENTS

| 2011/0163272 A1 | 7/2011 | Ono et al. |
| 2012/0015245 A1 | 1/2012 | Kishino et al. |

(Continued)

FOREIGN PATENT DOCUMENTS

| CA | 2607059 A1 | 11/2016 |
| CN | 102106023 A | 6/2011 |

(Continued)

OTHER PUBLICATIONS

Search report from International Application No. PCT/KR2018/003395, dated Jul. 6, 2018.

(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP (57) ABSTRACT

A method of preparing a slurry composition for a secondary battery positive electrode includes preparing a positive electrode active material pre-dispersion by mixing a lithium iron phosphate-based positive electrode active material, a dispersant, and a solvent, and preparing a slurry for a positive electrode by further mixing a conductive agent, a binder, and an additional solvent with the positive electrode active material pre-dispersion is provided. A positive electrode for (Continued)

a secondary battery which is prepared by using the same method, and a lithium secondary battery including the positive electrode are also provided.

13 Claims, 3 Drawing Sheets (51) Int. Cl.
    *H01M 4/36*     (2006.01)
    *H01M 4/525*     (2010.01)
    *H01M 4/58*     (2010.01)
    *H01M 4/62*     (2006.01)
    *H01M 4/66*     (2006.01)
    *H01M 4/75*     (2006.01)
    *B82Y 30/00*     (2011.01)
    *H01M 10/056*     (2010.01)
    *H01M 4/02*     (2006.01)

(52) U.S. Cl.
    CPC ......... *H01M 4/5825* (2013.01); *H01M 4/623* (2013.01); *H01M 4/661* (2013.01); *H01M 4/663* (2013.01); *H01M 4/75* (2013.01); *B82Y 30/00* (2013.01); *H01M 10/056* (2013.01); *H01M 2004/028* (2013.01); *H01M 2300/0037* (2013.01)

(56) References Cited

U.S. PATENT DOCUMENTS

| | | | |
|---|---|---|---|
| 2013/0089780 A1 | 4/2013 | Uezono | |
| 2014/0065477 A1 | 3/2014 | Han et al. | |
| 2015/0200399 A1 | 7/2015 | Yeou et al. | |
| 2015/0311511 A1 | 10/2015 | Okato et al. | |
| 2016/0104893 A1* | 4/2016 | Itou | H01M 4/622 |
| | | | 429/144 |
| 2016/0336587 A1 | 11/2016 | Jung et al. | |
| 2017/0256781 A1* | 9/2017 | Suzuki | H01M 4/0435 |
| 2017/0288181 A1* | 10/2017 | Hwang | H01M 50/116 |
| 2018/0053932 A1* | 2/2018 | Jeong | H01M 4/622 |

FOREIGN PATENT DOCUMENTS

| | | | |
|---|---|---|---|
| CN | 104798230 A | | 7/2015 |
| CN | 105932282 A | * | 9/2016 |
| CN | 106299291 A | | 1/2017 |
| EP | 2522625 A1 | | 11/2012 |
| JP | 2005251554 A | | 9/2005 |
| JP | 2013084397 A | | 5/2013 |
| JP | 2017054649 A | | 3/2017 |
| KR | 20140032229 A | | 3/2014 |
| KR | 20150016852 A | | 2/2015 |
| KR | 101569243 B1 | | 11/2015 |
| KR | 20160039835 A | | 4/2016 |
| KR | 101669807 B1 | | 10/2016 |
| WO | 2015098116 A1 | | 7/2015 |
| WO | 2016200223 A1 | | 12/2016 |

OTHER PUBLICATIONS

Chinese Search Report for Application No. 201880019062.3 dated Jan. 21, 2022, 4 pages.

* cited by examiner

METHOD OF PREPARING SLURRY COMPOSITION FOR SECONDARY BATTERY POSITIVE ELECTRODE, POSITIVE ELECTRODE FOR SECONDARY BATTERY PREPARED BY USING THE SAME, AND LITHIUM SECONDARY BATTERY INCLUDING THE POSITIVE ELECTRODE

CROSS-REFERENCE TO RELATED APPLICATIONS

The present application is a national phase entry under 35 U.S.C. § 371 of International Application No. PCT/KR2018/003395 filed on Mar. 22, 2018, which claims priority from Korean Patent Application Nos. 10-2017-0036335, filed on Mar. 22, 2017, and 10-2018-0033151, filed on Mar. 22, 2018, in the Korean Intellectual Property Office, the disclosures of which are incorporated herein by reference.

TECHNICAL FIELD

The present invention relates to a method of preparing a slurry composition for a secondary battery positive electrode, a positive electrode for a secondary battery which is prepared by using the same, and a lithium secondary battery including the positive electrode.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

A lithium-containing cobalt oxide ($LiCoO_2$) having a high operating voltage and excellent capacity characteristics has been used as a main component of a positive electrode active material of a conventional lithium secondary battery, wherein, since the lithium-containing cobalt oxide has very poor thermal properties due to an unstable crystal structure caused by lithium deintercalation and is expensive, there is a limitation in that mass production of the lithium secondary battery is difficult.

Recently, a lithium iron phosphate-based ($LiFePO_4$) compound, which not only has better high-temperature stability than cobalt, but is also inexpensive while having a voltage of ~3.5 V vs. lithium, a high bulk density of about 3.6 $g/cm^3$, and a theoretical capacity of about 170 mAh/g, is in the spotlight as a positive electrode active material of a lithium secondary battery.

The lithium iron phosphate-based positive electrode active material is a structurally very stable positive electrode active material, but is disadvantageous in that electrical conductivity and ionic conductivity are low. Thus, the lithium iron phosphate-based positive electrode active material is used in such a manner that the electrical conductivity is improved by coating the surface of the lithium iron phosphate-based positive electrode active material with carbon, and the ionic conductivity is improved by reducing a particle size of the lithium iron phosphate-based positive electrode active material.

However, since a specific surface area was increased and agglomeration of positive electrode active material particles severely occurred as the particle size of the positive electrode active material was reduced, there were limitations in that dispersion was difficult.

DISCLOSURE OF THE INVENTION

Technical Problem

An aspect of the present invention provides a method of preparing a slurry composition for a secondary battery positive electrode, which may suppress agglomeration of a lithium iron phosphate-based positive electrode active material with a reduced particle size, may improve dispersibility, may improve flowability by reducing viscosity, and may increase a final solid content, a positive electrode for a secondary battery which is prepared by using the same, and a lithium secondary battery including the positive electrode.

Technical Solution

According to an aspect of the present invention, there is provided a method of preparing a slurry composition for a secondary battery positive electrode which includes preparing a positive electrode active material pre-dispersion by mixing a lithium iron phosphate-based positive electrode active material, a dispersant, and a solvent; and preparing a slurry for a positive electrode by further mixing a conductive agent, a binder, and an additional solvent with the positive electrode active material pre-dispersion.

According to another aspect of the present invention, there is provided a positive electrode active material pre-dispersion composition including a lithium iron phosphate-based positive electrode active material, a dispersant, and a solvent, wherein the lithium iron phosphate-based positive electrode active material is a primary particle having an average particle diameter ($D_{50}$) of less than 1 μm and has a viscosity of 2,000 cps to 20,000 cps (25° C.)

According to another aspect of the present invention, there is provided a slurry composition for a secondary battery positive electrode which further includes a conductive agent and a binder in addition to the positive electrode active material pre-dispersion composition.

According to another aspect of the present invention, there is provided a positive electrode for a secondary battery, which is prepared by using the slurry composition for a secondary battery positive electrode, and a lithium secondary battery including the positive electrode.

Advantageous Effects

According to the present invention, a dispersion particle size may be reduced by suppressing agglomeration of a lithium iron phosphate-based positive electrode active material with a reduced particle size and improving dispersibility, processability may be improved by improving flowability by decreasing viscosity of a positive electrode active material pre-dispersion and a positive electrode slurry, and a final solid content may be increased.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A method of preparing a slurry composition for a secondary battery positive electrode of the present invention includes: preparing a positive electrode active material pre-dispersion by mixing a lithium iron phosphate-based positive electrode active material, a dispersant, and a solvent; and preparing a slurry for a positive electrode by further mixing a conductive agent, a binder, and an additional solvent with the positive electrode active material pre-dispersion.

The lithium iron phosphate-based positive electrode active material is a structurally very stable positive electrode active material, but is disadvantageous in that electrical conductivity and ionic conductivity are low. Thus, the lithium iron phosphate-based positive electrode active material is used in such a manner that the electrical conductivity is improved by coating the surface of the lithium iron phosphate-based positive electrode active material with carbon, and the ionic conductivity is improved by reducing a particle size of the lithium iron phosphate-based positive electrode active material.

Typically, since agglomeration of positive electrode active material particles severely occurred as the particle size of the lithium iron phosphate-based positive electrode active material was reduced, dispersion was difficult.

Thus, in the present invention, since, after a positive electrode active material pre-dispersion is first prepared by pre-dispersing a lithium iron phosphate-based positive electrode active material using a dispersant, a slurry for a positive electrode is prepared by further mixing a conductive agent and a binder with the positive electrode active material pre-dispersion, the dispersibility issues of the lithium iron phosphate-based positive electrode active material with a reduced particle size are addressed.

First, in the preparing of the positive electrode active material pre-dispersion, a lithium iron phosphate-based positive electrode active material and a dispersant are mixed in a solvent. The dispersant must be mixed together during the preparation of the positive electrode active material pre-dispersion, wherein a commonly used dispersant may be used as the dispersant, but a hydrogenated nitrile butadiene rubber (HNBR) may be more preferably used, although it is not necessary limited thereto.

The hydrogenated nitrile butadiene rubber (HNBR) denotes one in which a double bond originally included in a nitrile butadiene rubber (NBR) becomes a single bond by hydrogenation of the nitrile butadiene rubber (NBR).

The hydrogenated nitrile butadiene rubber (HNBR) dispersant includes a repeating unit derived from acrylonitrile (AN) in an amount of 20 wt % to 50 wt %, more preferably 25 wt % to 45 wt %, and most preferably 30 wt % to 40 wt % based on a total weight of the hydrogenated nitrile butadiene rubber (HNBR).

A hydrogenated butadiene (HBD) ratio in the hydrogenated nitrile butadiene rubber (HNBR) dispersant may satisfy the following Equation 1.

$$1(\%) \leq HBD \text{ wt }\%/(BD+HBD) \text{wt }\% \times 100 \leq 30(\%) \quad \text{[Equation 1]}$$

In Equation 1, HBD wt % is weight % of a hydrogenated butadiene (HBD)-derived repeating unit based on a total weight of the hydrogenated nitrile butadiene rubber (HNBR), and (BD+HBD) wt % is weight % of a butadiene (BD)-derived repeating unit and the hydrogenated butadiene (HBD)-derived repeating unit based on the total weight of the hydrogenated nitrile butadiene rubber (HNBR).

The hydrogenated butadiene (HBD) ratio of Equation 1 may be more preferably in a range of 5% to 25%, and may be most preferably in a range of 10% to 25%.

In a case in which the hydrogenated butadiene (HBD) ratio of Equation 1 is less than 1%, since adhesion to a surface of a carbon coating coated on a surface of the positive electrode active material is reduced, wetting is not well performed during the preparation of a dispersion, and thus, dispersibility may be reduced. In a case in which the hydrogenated butadiene (HBD) ratio is greater than 30%, solubility of the hydrogenated nitrile butadiene rubber in a dispersion medium may be reduced.

The hydrogenated nitrile butadiene rubber (HNBR) dispersant may have a weight-average molecular weight (MW) of 10,000 to 700,000, more preferably 25,000 to 600,000, and most preferably 200,000 to 400,000.

The dispersant may be included in an amount of 0.8 part by weight to 1.5 parts by weight, more preferably 0.8 part by weight to 1.3 parts by weight, and most preferably 1 part by weight to 1.2 parts by weight based on 100 parts by weight of the lithium iron phosphate-based positive electrode active material. In a case in which the dispersant is included in an amount of less than 0.8 part by weight, since a surface area of the positive electrode active material is increased as the dispersion particle size is reduced and the dispersant does not sufficiently surround the increased surface of the positive electrode active material, viscosity may be significantly increased, and, in a case in which the dispersant is included in an amount of greater than 1.5 part by weight, since an excessive amount of the dispersant, which is not adsorbed on the surface of the positive electrode active material, is present in the solvent, it may be a cause of increasing the viscosity.

The lithium iron phosphate-based positive electrode active material may be represented by the following Formula 1.

$$Li_{1+a1}Fe_{1-x1}M^1{}_{x1}PO_{4-b1}A_{b1} \quad \text{[Formula 1]}$$

In Formula 1, $M^1$ is at least one selected from the group consisting of manganese (Mn), nickel (Ni), cobalt (Co), copper (Cu), scandium (Sc), titanium (Ti), chromium (Cr), vanadium (V), and zinc (Zn), A is at least one selected from the group consisting of sulfur (S), selenium (Se), fluorine (F), chlorine (Cl), and iodine (I), $-0.5<a1<0.55$, $0\leq x1<0.5$, and $0\leq b1\leq 0.1$.

For example, the lithium iron phosphate-based positive electrode active material may be $LiFePO_4$. Also, in order to improve the electrical conductivity of the lithium iron phosphate-based positive electrode active material, the surface of the particle may be coated with a carbon-based material.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used, for example, N-methylpyrrolidone (NMP) may be used.

In the preparing of the positive electrode active material pre-dispersion, the lithium iron phosphate-based positive electrode active material, the dispersant, and the solvent are added and may then be dispersed by stirring or milling. The stirring or the milling may be performed according to a conventional stirring or milling method and, for example, may be performed by using a stirring or milling device such as a homogenizer, a bead mill, a ball mill, a basket mill, an attrition mill, a universal stirrer, a clear mixer, or a TK mixer. The dispersion may be more preferably performed by a homogenizer and a bead mill.

In the preparing of the positive electrode active material pre-dispersion, the dispersion may be performed such that an average particle diameter ($D_{50}$) of the lithium iron phosphate-based positive electrode active material included in the positive electrode active material pre-dispersion is less than 1 μm. The lithium iron phosphate-based positive electrode active material included in the positive electrode active material pre-dispersion that is prepared according to an embodiment of the present invention may be dispersed as a primary particle having an average particle diameter ($D_{50}$) of less than 1 μm, more preferably less than 0.9 μm, and most preferably less than 0.8 μm.

The preparing of the positive electrode active material pre-dispersion may be performed such that the positive electrode active material pre-dispersion has a viscosity of 2,000 cps to 20,000 cps (25° C.), more preferably 9,000 cps to 14,000 cps (25° C.), and most preferably 10,000 cps to 13,500 cps (25° C.)

In the present invention, since the positive electrode active material pre-dispersion is prepared by pre-dispersing the lithium iron phosphate-based positive electrode active material with a reduced particle size with the dispersant, dispersibility of the lithium iron phosphate-based positive electrode active material with a reduced particle size may be significantly improved and viscosity may be reduced at the same time.

Specifically, a positive electrode active material pre-dispersion composition prepared according to an embodiment of the present invention as described above includes a lithium iron phosphate-based positive electrode active material, a dispersant, and a solvent, wherein the lithium iron phosphate-based positive electrode active material may be a primary particle having an average particle diameter ($D_{50}$) of less than 1 μm and may have a viscosity of 2,000 cps to 20,000 cps (25° C.)

Next, a slurry for a positive electrode is prepared by further mixing a conductive agent, a binder, and an additional solvent with the positive electrode active material pre-dispersion.

The conductive agent is used to provide conductivity to the electrode, wherein any conductive agent may be used without particular limitation as long as it has electrical conductivity without causing adverse chemical changes in the battery. Specific examples of the conductive agent may be at least one selected from the group consisting of graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives. The conductive agent may be included in an amount of 1 wt % to 30 wt % based on a total weight of the slurry composition for a positive electrode.

The binder improves the adhesion between the positive electrode active material particles and the adhesion between the positive electrode active material and a current collector. Specific examples of the binder may be at least one selected from the group consisting of polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, a styrene-butadiene rubber (SBR), and a fluorine rubber, or copolymers thereof. The binder may be included in an amount of 1 wt % to 30 wt % based on the total weight of the slurry composition for a positive electrode.

Similar to the positive electrode active material pre-dispersion, the additional solvent may include dimethyl sulfoxide (DMSO), isopropyl alcohol, N-methylpyrrolidone (NMP), acetone, or water, any one thereof or a mixture of two or more thereof may be used, for example, N-methylpyrrolidone (NMP) may be used, and the same solvent as the solvent in the positive electrode active material pre-dispersion composition may be used.

In the preparing of the slurry for a positive electrode, a positive electrode active material of a lithium composite transition metal oxide represented by the following Formula 2 may be further mixed in addition to the lithium iron phosphate-based positive electrode active material included in the positive electrode active material pre-dispersion.

[Formula 2]

$Li_{a2}Ni_{1-x2-y2}Co_{x2}M^3_{y2}M^4_{z2}O_2$

In Formula 2, $1.0\leq a2\leq 1.5$, $0<x2\leq 0.2$, $0<y2\leq 0.2$, $0\leq z2\leq 0.1$, $M^3$ is at least one selected from the group consisting of Mn and aluminum (Al), and $M^4$ is at least one selected from the group consisting of barium (Ba), calcium (Ca), zirconium (Zr), Ti, magnesium (Mg), tantalum (Ta), niobium (Nb), and molybdenum (Mo).

The lithium iron phosphate-based positive electrode active material and the positive electrode active material of the lithium composite transition metal oxide represented by Formula 2 may be mixed in a weight ratio of 1:99 to 40:60, more preferably 2:98 to 30:70, and most preferably 5:95 to 15:85.

Also, when the slurry for a positive electrode is prepared, a dispersant may be further mixed with the positive electrode active material pre-dispersion, and, in addition, other additives may be further mixed to achieve performance required for the electrode.

As described above, since the positive electrode active material pre-dispersion is prepared by pre-dispersing the lithium iron phosphate-based positive electrode active material with the dispersant and the slurry for a positive electrode is prepared by mixing the conductive agent and the binder with the positive electrode active material pre-dispersion, the dispersibility of the lithium iron phosphate-based positive electrode active material is improved, the viscosity of the slurry for a positive electrode is reduced and flowability is improved to improve processability, and a solid content of the final positive electrode slurry may be increased. Also, the more the dispersibility of the lithium iron phosphate-based positive electrode active material is improved, the more the positive electrode adhesion may be improved, and thus, since the adhesion is improved, the amount of the binder in the positive electrode slurry composition may be reduced in comparison to a conventional case.

Also, the present invention provides a positive electrode for a secondary battery which is prepared by using the above-described slurry composition for a secondary battery positive electrode.

Specifically, the positive electrode includes a positive electrode collector and a positive electrode active material layer which is disposed on at least one surface of the positive electrode collector and is formed by using the above-described slurry composition for a positive electrode.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 µm to 500 µm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode may be prepared according to a typical method of preparing a positive electrode except that the above-described slurry composition for a positive electrode is used. Specifically, the above-described slurry composition for a positive electrode is coated on the positive electrode collector, and the positive electrode may then be prepared by drying and rolling the coated positive electrode collector.

Also, as another method, the positive electrode may be prepared by casting the above-described slurry composition for a positive electrode on a separate support and then laminating a film separated from the support on the positive electrode collector.

Furthermore, according to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

100 parts by weight of an agglomerated $LiFePO_4$ positive electrode active material having an average particle diameter ($D_{50}$) of 1.2 μm, 1 part by weight of a HNBR dispersant (AN: 37 wt %, HBD ratio: 21%), and 65.7 parts by weight of an N-methylpyrrolidone solvent were mixed, and a wetting process was performed at 3,000 rpm for 60 minutes using a Homo mixer. Thereafter, a circulation process was performed at 2,000 rpm for 90 minutes using a bead mill (bead size: 1 mm) to prepare a positive electrode active material pre-dispersion. In this case, an average particle diameter ($D_{50}$) of the $LiFePO_4$ positive electrode active material dispersed in the positive electrode active material pre-dispersion was 0.75 μm.

A $LiNi_{0.6}Mn_{0.2}Co_{0.2}O_2$ positive electrode active material was added to the positive electrode active material pre-dispersion in a weight ratio of 9:1 with respect to the $LiFePO_4$, and a slurry for a positive electrode was prepared by mixing the positive electrode active material (NMC+LFP), PVdF as a binder, and carbon black, as a conductive agent, in a weight ratio of 96:1:3 in an N-methylpyrrolidone solvent and dispersing at 3,000 rpm for 80 minutes using a Homo mixer. In this case, a solid content of the prepared slurry for a positive electrode was about 60.0%.

Example 2

A positive electrode active material pre-dispersion was prepared in the same manner as in Example 1 except that a wetting process was performed at 3,000 rpm for 60 minutes using a Homo mixer and a circulation process was performed at 2,000 rpm for 30 minutes using a bead mill (bead size: 1 mm) during the preparation of the positive electrode active material pre-dispersion. In this case, an average particle diameter ($D_{50}$) of the $LiFePO_4$ positive electrode active material dispersed in the positive electrode active material pre-dispersion was 0.92 μm.

Example 3

A positive electrode active material pre-dispersion was prepared in the same manner as in Example 1 except that a wetting process was performed at 3,000 rpm for 60 minutes using a Homo mixer and bead milling was not performed during the preparation of the positive electrode active material pre-dispersion. In this case, an average particle diameter ($D_{50}$) of the $LiFePO_4$ positive electrode active material dispersed in the positive electrode active material pre-dispersion was 1.17 μm.

Comparative Example 1

$LiFePO_4$ having an average particle diameter ($D_{50}$ of 1.2 μm as a positive electrode active material, carbon black as a conductive agent, and PVDF, as a binder, were mixed in a weight ratio of 85:10:5 in an N-methylpyrrolidone solvent, a wetting process was performed at 3,000 rpm for 60 minutes using a Homo mixer, and, subsequently, a circulation process was performed at 2,000 rpm for 90 minutes using a bead mill (bead size: 1 mm) to prepare a slurry for a positive electrode.

With respect to Comparative Example 1 in which a positive electrode active material pre-dispersion was not prepared and the positive electrode active material, the conductive agent, and the binder were added all at once to prepare a positive electrode slurry, since dispersion of the positive electrode active material was not sufficiently performed, coarse particles having a diameter of about 30 μm were generated. When the coarse particles were generated as described above, filter clogging or surface defects, in which grains were generated on a coating surface, may occur in a positive electrode slurry coating process.

Comparative Example 2

A slurry for a positive electrode was prepared in the same manner as in Example 1 except that a HNBR dispersant was not added during the preparation of the positive electrode active material pre-dispersion.

Experimental Example 1: Shear Viscosity Measurement

Shear viscosities of the slurries for a positive electrode prepared in Examples 1 to 3 and Comparative Examples 1 and 2 were measured using a TA instrument rheometer (DHR2). The shear viscosity was measured in such a manner that a concentric cylinder accessory of the DHR2 rheometer was used, 10 ml of the slurry was introduced, and the viscosity was then measured at 25° C. The results thereof are presented in FIG. 1.

Figure 1:
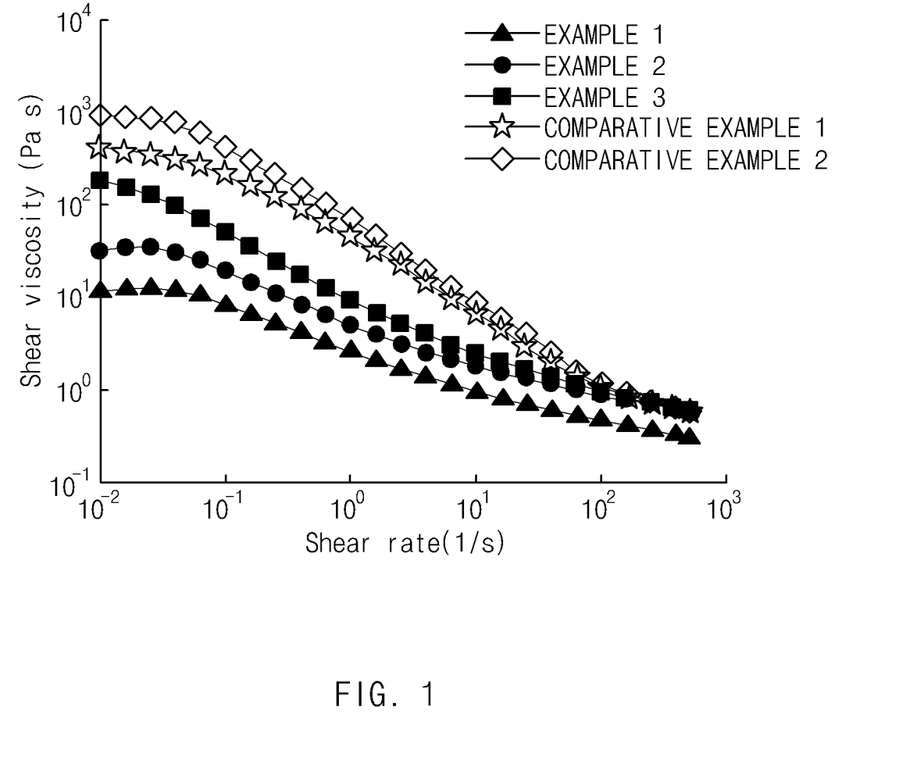
FIG. 1 is a graph illustrating shear viscosities of slurry compositions for a positive electrode according to Examples 1 to 3 and Comparative Examples 1 and 2.

Referring to FIG. 1, with respect to Examples 1 to 3 in which the lithium iron phosphate-based positive electrode active material was pre-dispersed with the HNBR dispersant to prepare the positive electrode active material pre-dispersion, and the binder and the conductive agent were then added to prepare the slurry for a positive electrode, viscosities were overall significantly lower than that of Comparative Example 1. This denoted that the dispersibility of the positive electrode active material was significantly improved. With respect to Comparative Example 2, since active material particles were dispersed by using a pre-dispersion process without a dispersant, the dispersed particles were re-agglomerated. Thus, a dispersibility improvement effect was not observed, and it may be confirmed that its viscosity was more increased than that of Comparative Example 1 in which the pre-dispersion was not performed. With respect to Examples 1 and 2 in which the dispersion was performed such that the average particle diameter ($D_{50}$) of the lithium iron phosphate-based positive electrode active material was less than 1 μm during the preparation of the positive electrode active material pre-dispersion, the dispersibility was further improved, and, accordingly, it may be confirmed that their viscosities were further reduced.

Experimental Example 2: Flowability Evaluation

Viscoelasticities of the slurries for a positive electrode prepared in Examples 1 to 3 and Comparative Examples 1 and 2 were measured using a TA instrument rheometer (DHR2). The viscoelasticity was measured in such a manner that a concentric cylinder accessory of the DHR2 rheometer was used, 10 ml of the slurry was introduced, and the viscoelasticity was then measured at 25° C., and, in this case, the viscoelasticity is a measurement of the response (stress) obtained by applying sine wave vibration (strain) to a fluid, wherein it may be evaluated that viscosity of the fluid increases and flowability improves as a phase angle increases. The measurement results thereof are presented in FIG. 2.

Figure 2:
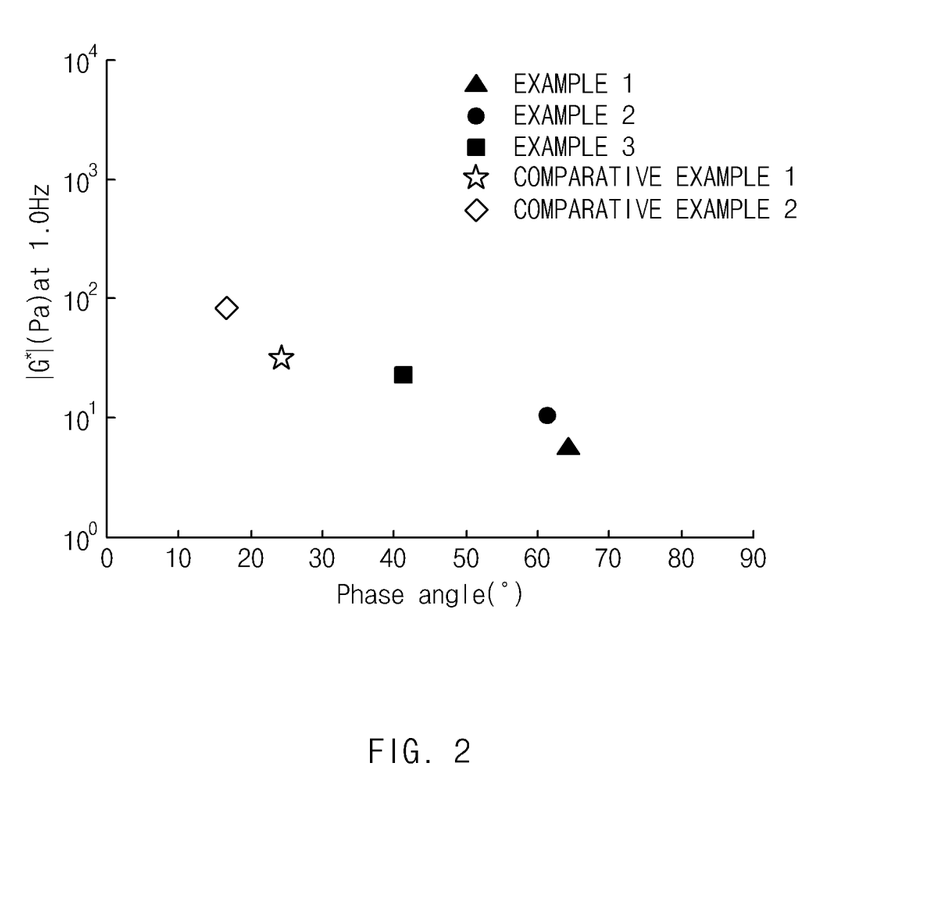
FIG. 2 is a graph illustrating flowabilities of the slurry compositions for a positive electrode according to Examples 1 to 3 and Comparative Examples 1 and 2.

Referring to FIG. 2, with respect to Examples 1 to 3 in which the lithium iron phosphate-based positive electrode active material was pre-dispersed with the HNBR dispersant to prepare the positive electrode active material pre-dispersion, and the binder and the conductive agent were then added to prepare the slurry for a positive electrode, viscoelasticities were greater than that of Comparative Example 1, and thus, it may be understood that flowabilities were significantly improved. With respect to Comparative Example 2, since the active material particles were dispersed by using the pre-dispersion process without the dispersant, the dispersed particles did not maintain slurry phase stability and were re-agglomerated, and thus, it may be confirmed that its flowability was further reduced. With respect to Examples 1 and 2 in which the dispersion was performed such that the average particle diameter ($D_{50}$) of the lithium iron phosphate-based positive electrode active material was less than 1 μm during the preparation of the positive electrode active material pre-dispersion, it may be confirmed that their flowabilities were further improved. This seems to be an effect of decreasing structure formation between the particles in the positive electrode slurry due to the improvement of dispersibility.

Experimental Example 3: Positive Electrode Adhesion Evaluation

The slurries for a positive electrode prepared in Examples 1 to 3 and Comparative Examples 1 and 2 were respectively coated on aluminum current collectors, dried at 130° C., and then pressed to prepare each positive electrode.

Adhesion of the positive electrode prepared by using each of the slurries for a positive electrode prepared in Examples 1 to 3 and Comparative Examples 1 and 2 was measured using a TXA universal testing machine (UTM). In the measurement method, the positive electrode punched into an area of 10 mm×150 mm was attached to a slide glass having a double-sided tape attached thereto. Thereafter, in order to obtain a uniform attachment surface, a sample was prepared by pressing the positive electrode using a roller having a load of 2 kg, the prepared sample was placed in a measuring unit of the adhesion measuring instrument and then peeled off at an angle of 180 degrees, and the measurement results thereof are presented in FIG. 3.

Figure 3:
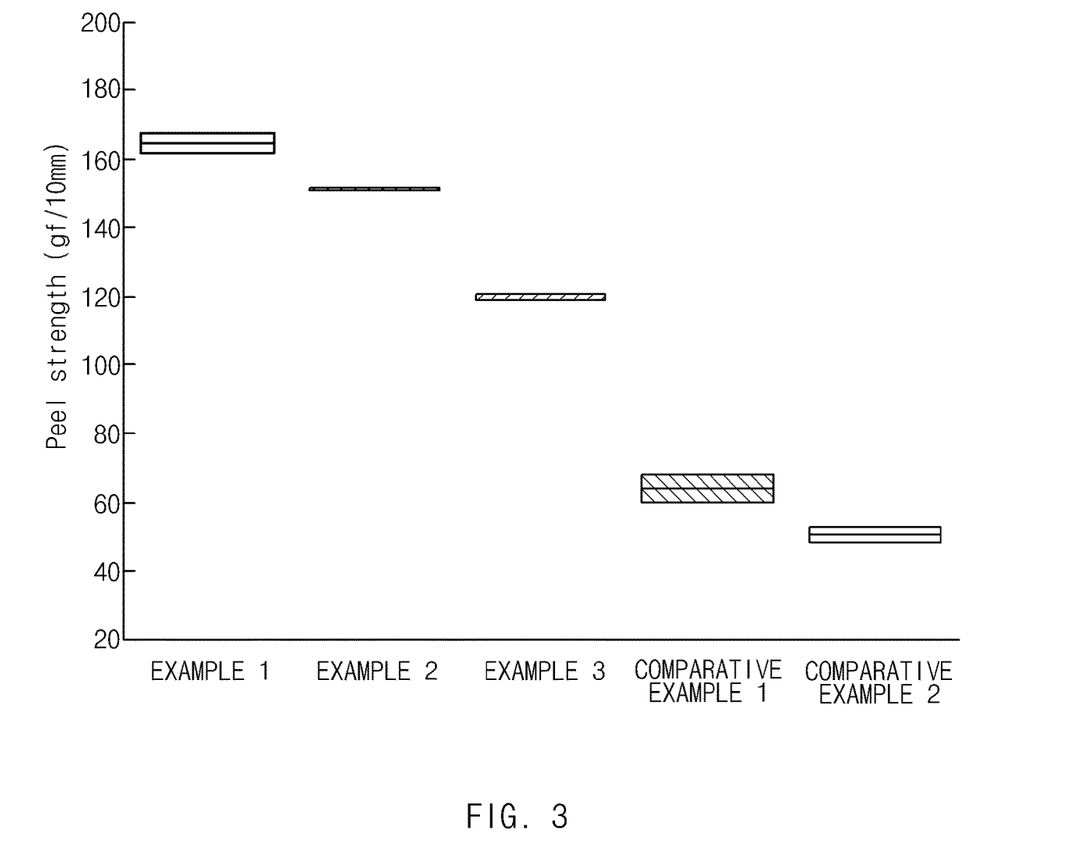
FIG. 3 is a graph illustrating adhesions of positive electrodes prepared by using the slurry compositions for a positive electrode according to Examples 1 to 3 and Comparative Examples 1 and 2.

Referring to FIG. 3, with respect to Examples 1 to 3 in which the lithium iron phosphate-based positive electrode active material was pre-dispersed with the HNBR dispersant to prepare the positive electrode active material pre-dispersion, and the binder and the conductive agent were then added to prepare the slurry for a positive electrode, it may be understood that electrode adhesions were significantly increased in comparison to Comparative Examples 1 and 2. It is considered that, with respect to Comparative Examples 1 and 2, since the binder present in the agglomerated positive electrode active material particles did not contribute to adhesion, their adhesions were reduced.

With respect to Examples 1 and 2 in which the dispersion was performed such that the average particle diameter ($D_{50}$) of the lithium iron phosphate-based positive electrode active material was less than 1 μm during the preparation of the positive electrode active material pre-dispersion, since the electrode adhesions were further improved, it may be understood that the more the dispersibility of the positive electrode active material was improved, the more the electrode adhesion was increased. Thus, as in Examples 1 and 2, it was advantageous in that a ratio of the binder in the electrode composition may be reduced as the electrode adhesion was improved.

The invention claimed is:

1. A method of preparing a slurry composition for a secondary battery positive electrode, comprising:
preparing a positive electrode active material pre-dispersion by mixing a lithium iron phosphate-based positive electrode active material, a dispersant, and a solvent; and
mixing a conductive agent, a binder, and an additional solvent with the positive electrode active material pre-dispersion to form the slurry composition,
wherein the dispersant comprises a hydrogenated nitrile butadiene rubber (HNBR), and
wherein, the preparing of the positive electrode active material pre-dispersion comprises:
performing dispersion such that an average particle diameter ($D_{50}$) of the lithium iron phosphate-based positive electrode active material included in the positive electrode active material pre-dispersion is less than 1 μm.

2. The method of claim 1, wherein the dispersant is mixed in an amount of 0.8 part by weight to 1.5 parts by weight based on 100 parts by weight of the lithium iron phosphate-based positive electrode active material.

3. The method of claim 1, wherein the preparing the positive electrode active material pre-dispersion comprises:
adding the lithium iron phosphate-based positive electrode active material, the dispersant, and the solvent, and
dispersing by stirring or milling.

4. The method of claim 1, wherein the positive electrode active material pre-dispersion has a viscosity of 2,000 cps to 20,000 cps (25° C.).

5. The method of claim 1, wherein the lithium iron phosphate-based positive electrode active material is represented by Formula 1:

$$Li_{1+a1}Fe_{1-x1}M^1_{x1}PO_{4-b1}A_{b1}$$ [Formula 1]

wherein, in Formula 1, $M^1$ is at least one selected from the group consisting of manganese (Mn), nickel (Ni), cobalt (Co), copper (Cu), scandium (Sc), titanium (Ti), chromium (Cr), vanadium (V), and zinc (Zn), A is at least one selected from the group consisting of sulfur (S), selenium (Se), fluorine (F), chlorine (Cl), and iodine (I), −0.5<a1<0.5, 0≤x1<0.5, and 0≤b1≤0.1.

6. The method of claim 1, wherein the binder comprises polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated-EPDM, a styrene-butadiene rubber (SBR), a fluorine rubber, or a copolymer thereof.

7. The method of claim 1, wherein the conductive agent comprises carbon black, graphite, carbon fibers, carbon nanotubes, acetylene black, Ketjen black, channel black, furnace black, lamp black, thermal black, metal powder, metal fibers, conductive metal oxides, conductive whiskers, or conductive polymers.

8. The method of claim 1, wherein the preparing of the slurry for a positive electrode further comprises: mixing a positive electrode active material of a lithium composite transition metal oxide represented by Formula 2 with the positive electrode active material pre-dispersion:

$$Li_{a2}Ni_{1-x2-y2}Co_{x2}M^3_{y2}M^4_{z2}O_2$$ [Formula 2]

wherein, in Formula 2, 1.0≤a2≤1.5, 0<x2≤0.2, 0<y2≤0.2, 0≤z2≤0.1, $M^3$ is at least one selected from the group consisting of manganese (Mn) and aluminum (Al), and $M^4$ is at least one selected from the group consisting of barium (Ba), calcium (Ca), zirconium (Zr), titanium (Ti), magnesium (Mg), tantalum (Ta), niobium (Nb), and molybdenum (Mo).

9. The method of claim 8, wherein the lithium iron phosphate-based positive electrode active material and the positive electrode active material of the lithium composite transition metal oxide represented by Formula 2 are mixed in a weight ratio of 1:99 to 40:60.

10. A positive electrode active material pre-dispersion composition comprising:
a lithium iron phosphate-based positive electrode active material, a dispersant, and a solvent,
wherein the lithium iron phosphate-based positive electrode active material is a primary particle having an average particle diameter ($D_{50}$) of less than 1 μm and has a viscosity of 2,000 cps to 20,000 cps (25° C.),
wherein the dispersant comprises a hydrogenated nitrile butadiene rubber (HNBR).

11. A slurry composition for a secondary battery positive electrode, comprising a conductive agent, a binder, and the positive electrode active material pre-dispersion composition of claim 10.

12. A positive electrode for a secondary battery prepared by using the slurry composition for a secondary battery positive electrode of claim 11.

13. A lithium secondary battery comprising the positive electrode for a secondary battery of claim 12.

* * * * *